(12) United States Patent
Toettcher

(10) Patent No.: US 6,471,166 B1
(45) Date of Patent: Oct. 29, 2002

(54) DISPLAY DEVICE FOR NOVELTY ITEM

(75) Inventor: Christine P. Toettcher, St. Peters, MO (US)

(73) Assignee: Progressive Balloons, Inc., St. Peters, MO (US)

( * ) Notice: Subject to any disclaimer, the term of this patent is extended or adjusted under 35 U.S.C. 154(b) by 0 days.

(21) Appl. No.: 09/841,651

(22) Filed: Apr. 24, 2001

Related U.S. Application Data

(63) Continuation-in-part of application No. 29/133,106, filed on Nov. 22, 2000, now Pat. No. Des. 456,469.

(51) Int. Cl.[7] .......................... A45D 19/04; A47J 47/16; F16M 11/00
(52) U.S. Cl. ..................................... 248/175; 248/125.1
(58) Field of Search ............................. 248/27.8, 122.1, 248/125.1, 125.3, 125.7, 125.8, 175, 153, 413, 346.03, 126, 156; 47/44.12, 47, 39, 65.5, 66.6; 446/268; D6/417; D11/164

(56) References Cited

U.S. PATENT DOCUMENTS

| 180,613 | A | | 8/1876 | McCutchins ................. 446/268 |
|---|---|---|---|---|
| 551,000 | A | * | 12/1895 | Parker ........................... 47/47 |
| 897,006 | A | * | 8/1908 | Muller ........................... 47/47 |
| 1,617,494 | A | * | 2/1927 | Nuckols ......................... 47/47 |
| 1,808,292 | A | | 6/1931 | Coppersmith ................. 40/645 |
| 2,923,415 | A | * | 2/1960 | Brown .......................... 211/65 |
| 3,279,736 | A | | 10/1966 | Vovt, III ................ 248/346.03 |
| 3,516,632 | A | | 6/1970 | Hall ........................ 248/176.1 |
| 4,706,915 | A | | 11/1987 | Cindric et al. .............. 248/122 |
| 4,914,857 | A | * | 4/1990 | Dodgen .......................... 47/47 |
| 5,003,725 | A | | 4/1991 | Maddox ......................... 47/39 |
| 5,048,231 | A | * | 9/1991 | Brown ........................... 47/45 |
| 5,423,148 | A | * | 6/1995 | Thornhill ..................... 47/58.1 |
| D362,356 | S | * | 9/1995 | Nicholas ..................... D6/417 |
| 5,450,692 | A | * | 9/1995 | Ruibal ........................... 47/83 |
| 5,549,499 | A | | 8/1996 | Foskey et al. .............. 446/268 |
| 5,735,075 | A | | 4/1998 | Honkawa et al. .......... 47/41.12 |
| 5,967,470 | A | | 10/1999 | Guschlbauer ............... 248/121 |
| 6,038,812 | A | | 3/2000 | Belokin et al. ............ 47/41.01 |

* cited by examiner

Primary Examiner—Leslie A. Braun
Assistant Examiner—Gwendolyn Baxter
(74) Attorney, Agent, or Firm—Grace J. Fishel

(57) ABSTRACT

A display device has a holder for a displayed item, such as a toy. The holder is adjustable to accommodate displayed items of a variety of sizes and shapes. The adjustment feature includes legs which may be cut to reduce their length. An additional adjustment permits the relative spacing of the components of the holder. Further adjustment may be accomplished by resiliently distorting the components of the holder. A retainer may be included to hold the displayed item in the device.

19 Claims, 3 Drawing Sheets

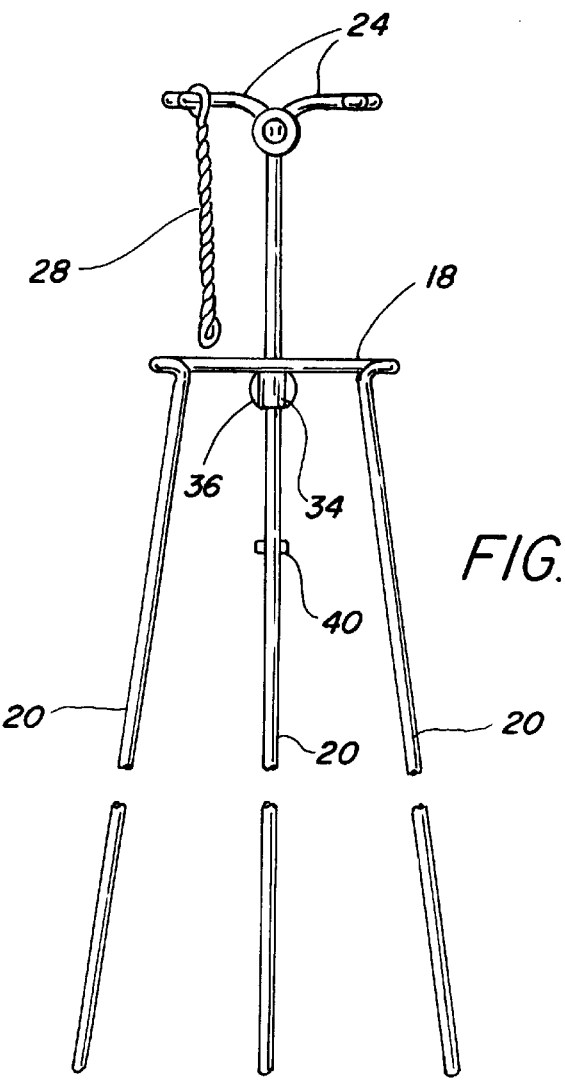
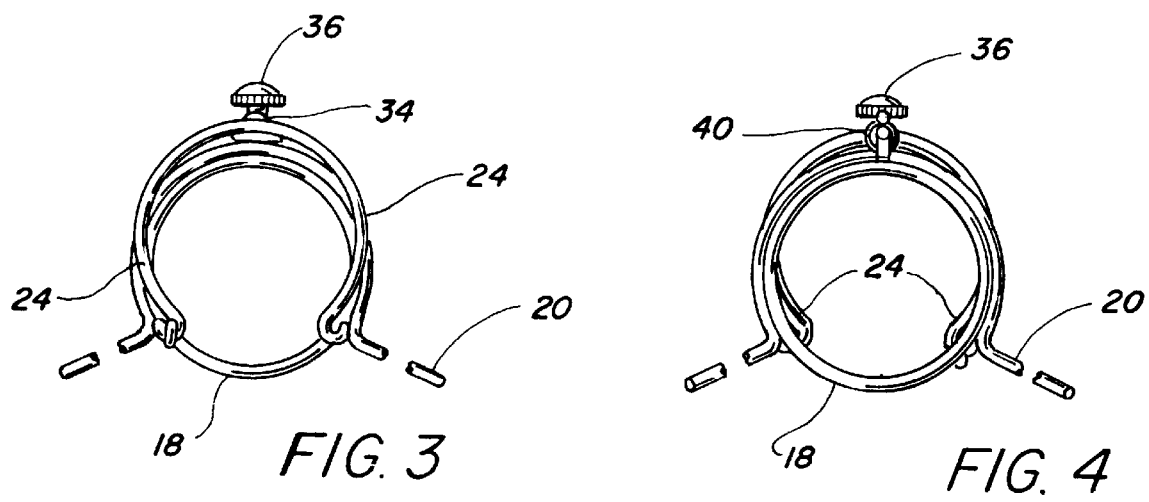

DISPLAY DEVICE FOR NOVELTY ITEM

This application is a continuation-in-part of U.S. Design patent application Ser. No. 29/133,106, filed Nov. 22, 2000 now U.S. Pat. No. D452,469.

BACKGROUND OF THE INVENTION

1. Field of the Invention

This invention relates to the field of novelty items and in particular relates to devices for displaying novelty items. Further, the invention relates to the field of devices for displaying novelty items with other companion products such as flowers, to provide an attractive display and promote the sale of the novelty items with such companion products.

2. Brief Description of the Prior Art

It may be desirable to display and sell toys, such as, figurines, dolls and stuffed animals in conjunction with flowers, floral arrangements, potted plants, fruit baskets and similar arrangements. The doll, figurine, animal or the like may be supported on or in the display. The support can be as simple as a ribbon which is tied to a vase or a basket. However, some supports are more complex to provide a fanciful or imaginative display or to incorporate other functions, such as card holders for messages.

Applicant is aware of the following U.S. Patents which are incorporated by reference herein: U.S. Pat. Nos. 180,613, 1,808,292, 3,279,736, 3,516,632, 4,706,915, 5,003,725, 5,549,499, 5,735,075, 5,967,470 and 6,038,812.

BRIEF SUMMARY OF THE INVENTION

In view of the above, it is an object of the present invention to provide a new and novel device for displaying an item, such as a toy, for sale with a companion product. It is another object to provide an adjustable device for displaying items having a range of sizes and shapes. It is also an object to provide a device for displaying an item for sale with a companion product which will accommodate a range of sizes and shapes of the companion product. It is a further object of this invention to provide a device for displaying figurines, dolls, stuffed animals and the like in conjunction with companion products, such as flowers, the device having adjustments to accommodate a variety of sizes and shapes of all of the products displayed. Other objects and features of the invention will be in part apparent and in part pointed out hereinafter.

The device of the present invention permits toys, such as dolls, figurines, stuffed animals and the like to be displayed in conjunction with other companion products, for example, flowers, floral displays and so forth. The device of the invention provides a support for the item to be displayed and provides spacing elements which allow the device to accommodate a variety of sizes and shapes of companion products.

The device of the invention may include adjustments to accommodate a range of sizes and shapes of the items to be displayed and to accommodate a range of sizes and shapes of the companion products, as disclosed herein. The device of the invention may include retainers to secure the displayed items in the device. The retainers may also be adjustable.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 2 is a front view of the device of the invention;

FIG. 3 is a top plan view of the device of the invention;

FIG. 4 is a bottom view of the device of the invention as shown in FIG. 3;

DETAILED DESCRIPTION OF THE INVENTION

Figure 1:
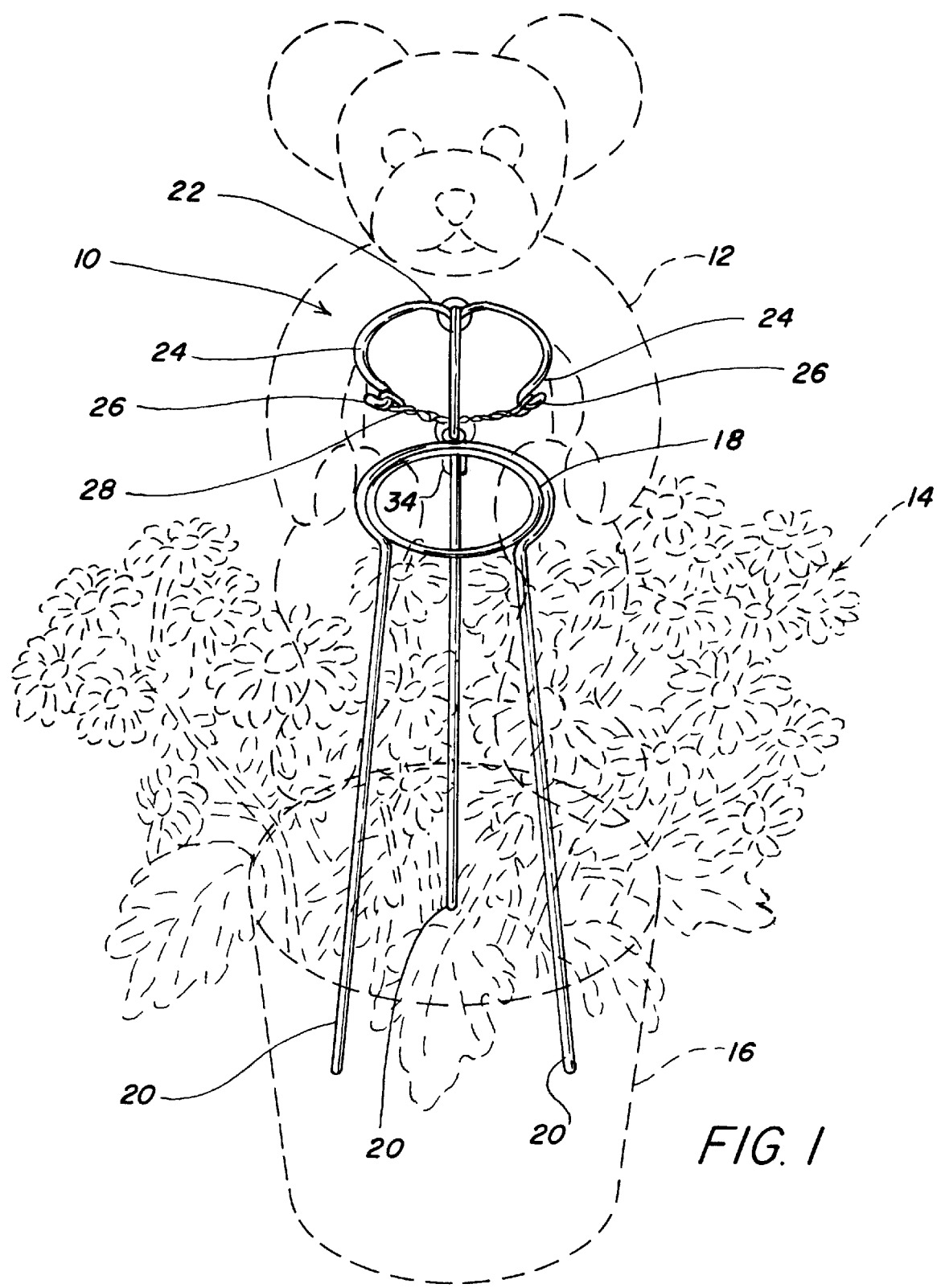
FIG. 1 is a perspective view of the device of the invention with an exemplary displayed product.
Figure 5:
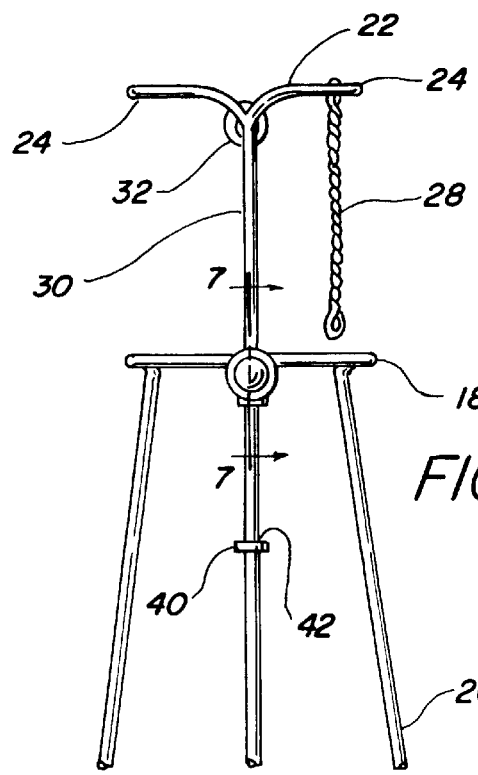
FIG. 5 is a rear view of the device of the invention.

Referring to FIG. 1, a display device 10 of the invention is shown holding a displayed item 12 such as a stuffed animal toy. Stuffed animal toy 12 is displayed with a companion product 14, as shown. Companion product 14 is a floral display or live plant arranged in a container 16. Stuffed animal toy 12 is supported on a horizontal ring 18, although it will be appreciated by those skilled in the art that ring 18 may be placed in other orientations.

A plurality of legs 20 depend from ring 18. As shown in FIG. 1, legs 20 extend into the interior of container 16. However, legs 20 may also be placed outside a vase or container, as described herein. The length of legs 20 may be adjusted, as described to position stuffed animal toy 12 or some other displayed item in the desired proximity to companion product 14, such as the floral arrangement or live plant shown in FIG. 1 and give the desired aesthetic effect.

Display device 10 has an additional support 22 for the displayed item 12 such as a stuffed animal toy as shown in FIG. 1. Support 22 has a plurality of extending arms 24 which may be adjusted to grip stuffed animal toy 12. Extending arms 24 may have a curvature and terminate in hooks or eyelets 26 which co-operate with a retainer 28, as shown. Retainer 28 may also be adjustable, for example, by being formed of an elastic material, such as rubber. The tension in retainer 28 may be increased or decreased by winding the elastic material about its longitudinal axis, or by unwinding it, as will be appreciated by those skilled in the art.

Display device 10 of the invention will typically be made of a rigid or semi-rigid material, such as metal rods or wire. For example, of stiff aluminum or steel wire. However, the display device 10 could also be made of a structural plastic material, such as polypropylene or the like, as will be appreciated by those skilled in the art. The elements of display device 10 may be joined by soldering, by welding, by adhesive bonding or by other conventional means.

The material forming display device 10 will be sufficiently resilient that legs 20 of display device 10 may be adjusted by compressing them inwardly to be inserted into container 16, as shown in FIG. 1. The legs 20 may also be bent outwardly so that they may be placed outside of an associated container or vase. The length of legs 20 may be adjusted to the desired length by clipping the ends of the legs 20.

Arms 24 may also be adjusted by compressing them inwardly to decrease the circumference of the space they enclose or by bending them outwardly to increase the circumference of the space they enclose. This adjustment permits display device 10 to accommodate displayed items 12 of a variety of sizes and shapes.

Figure 7:
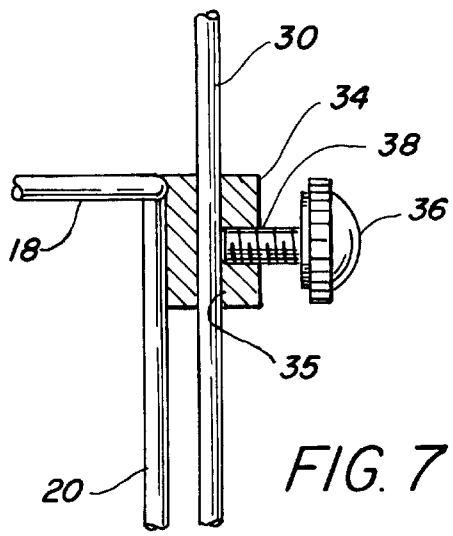
FIG. 7 is a detail, partly in section, taken along line 7—7 in FIG. 6.
Figure 6:
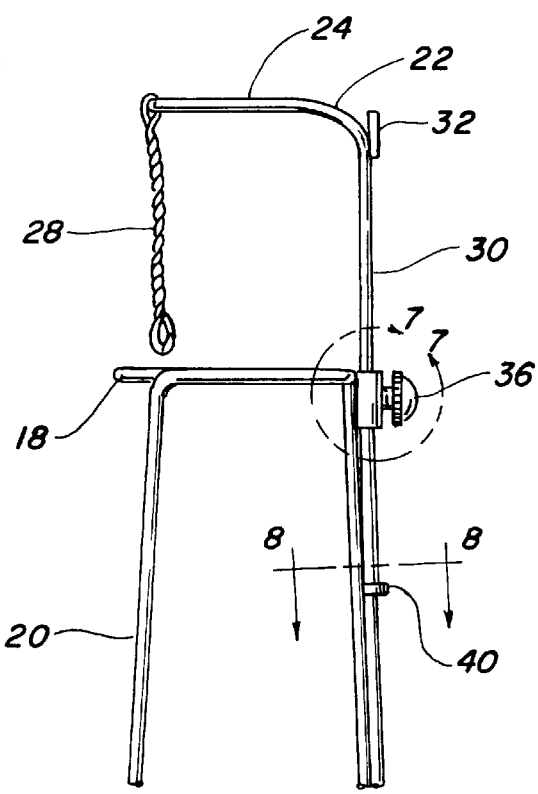
FIG. 6 is a side view of the device of the invention.
Figure 8:
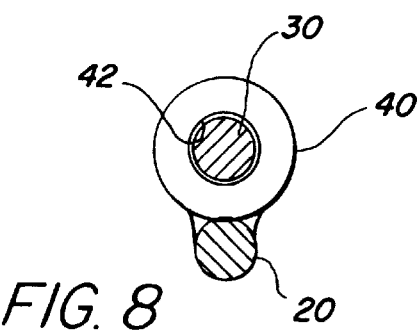
FIG. 8 is a detail, in section, taken along line 8—8 in FIG. 6.

In addition, display device 10, may have a further adjustment to accommodate displayed items of varying sizes and shapes. Referring to FIGS. 6–8, an additional adjustment is shown in further detail. Support 22 is attached to a depending element 30. If desired, the attachment between support 22 and depending element 30 may be strengthened by a reinforcing member 32. One of legs 20 is provided with a receiver 34. Receiver 34 is shown at a location adjacent to ring 18, but it will be appreciated that receiver 34 could be at another location on leg 20 without impairing its function. Receiver 34 has an aperture 35 therethrough, shown in FIG. 7, that accepts depending element 30 in a vertical sliding relationship thereto. Receiver 34 also has a clamp 36 that selectively arrests the sliding travel of depending element 30 in relation to receiver 34. As shown in FIG. 7, clamp 36 may be placed in a transverse orifice 38 in receiver 34. Clamp 36 may be held in place by friction, by spring force or other means, as known in the art. However, if clamp 36 is a threaded fastener, such as a set screw, and orifice 38 is threaded to receive clamp 36, a secure attachment can be achieved.

Leg 20 having receiver 34 mounted thereon may also have an additional stabilizing element 40, as shown in FIG. 8. Stabilizing element 40 may be a loop fastened to leg 20 at a position spaced from receiver 34. Stabilizing element 40 has an aperture 42 therethrough that receives depending element 30 in a vertical sliding relationship, as shown. Receiver 34 and stabilizing element 40 co-operate to provide rigidity to depending element 30 and support 22 and permit the spacial relationship of support 22 to ring 18 to be adjusted. If clamp 36 is released, depending element 30 and attached support 22 may be moved vertically to a new position and fixed in that position by engaging clamp 36.

While the description given herein illustrates display device 10 with adjustable support 22 located above stationary support 18, the elements may be reversed. Legs 20 may be attached to support 22, for example at reinforcement 32. Receiver 34 and clamp 36 may be placed on the interior side of a leg 20 and support 18 may be attached to the lower end of depending element 30. This arrangement permits adjustment of support 18 toward and away from support 22.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed is:

1. A display device for novelty items, the display device having a first support thereon for such an item, the device having a second support thereon, the second support being spaced from the first support, said second support having a depending member thereon, said device having a receiver thereon for receiving the depending member, said first support having a plurality of legs depending therefrom, the legs being resiliently adjustable toward and away from each other and being severable at their extremities to reduce their length, said second support having a plurality of arms extending therefrom, the extending arms being resiliently adjustable for retaining a displayed item therebetween, the extending arms terminating in spaced apart ends, the device having a fastening element extending between the spaced apart ends and co-operating therewith to retain a displayed item between the extending arms, the fastening element being selectively attachable to at least one of the spaced apart ends.

2. The device of claim 1 wherein the spaced apart ends terminate in hooks or eyelets and the fastening element co-operates with the hooks or eyelets to retain a displayed item between the extending arms.

3. The device of claim 1 wherein the second support is adjustable in relation to the first support.

4. The device of claim 3 wherein the second support is vertically adjustable in relation to the first support.

5. A display device for a novelty item, the display device having a first substantially horizontal support thereon, the first support having a plurality of legs depending therefrom, the legs being resiliently adjustable toward and away from each other and being severable at their extremities to reduce their length, the device having a second support thereon, the second support having a depending member thereon, the first support having a receiver thereon for receiving the depending member, the second support being spaced from the first support and said depending member being vertically adjustable in the receiver in relation to the first support, the second support having a plurality of arms extending substantially horizontally therefrom, the extending arms being spaced from each other and forming an item retaining space therebetween, the extending arms being resiliently adjustable in relation to each other.

6. The device of claim 5 wherein the arms terminate in spaced apart ends, the device having a fastening element extending between the spaced apart ends and co-operating therewith to retain a displayed item between the extending arms.

7. The device of claim 6 wherein the fastening element is selectively attachable to at least one of the spaced apart ends.

8. The device of claim 7 wherein the spaced apart ends terminate in hooks or eyelets and wherein the fastening element co-operates with the hooks or eyelets to retain a displayed item between the extending arms.

9. The device of claim 8 wherein the fastening element is an elastic material.

10. The device of claim 5 wherein the extending arms are curved to enclose a space to receive and retain a novelty item.

11. The device of claim 5 wherein the second support is spaced above the first support, the second support having a depending member thereon, the device having a receiver thereon, the receiver receiving the depending member, the receiver having a clamp, the receiver and clamp co-operating with the depending member to adjustably retain the second support in a spaced relationship to the first support.

12. The device of claim 11 wherein the clamp is a set screw threaded into the receiver.

13. The device of claim 11 wherein the receiver is mounted on a leg of the device.

14. The device of claim 11 wherein the device has a guide for the depending member and wherein the guide is spaced from the receiver.

15. The device of claim 11 wherein the receiver is mounted on a leg of the device and wherein the device has a guide for the depending member, the guide being spaced from the receiver and being mounted on the leg of the device on which the receiver is mounted.

16. A display device for a novelty item, the display device having a first substantially horizontal support thereon, the first support having a plurality of legs depending therefrom, the legs being resiliently adjustable toward and away from each other and being severable at their extremities to reduce their length, the device having a second support thereon, the second support being spaced from the first support and being vertically adjustable in relation to the first support, the second support having a plurality of arms extending substantially horizontally therefrom, the arms being spaced from each other and forming an item retaining space therebetween, the arms being resiliently adjustable in relation to each other and terminating in spaced apart ends, the spaced apart ends having terminal hooks or eyelets, the device having a resilient fastening element which is selectively attachable to at least one of the spaced apart ends and which co-operates with the hooks or eyelets to retain a displayed item between the extending arms, the second support being located above the first support and having a depending member, the device having a receiver thereon for slidingly receiving the depending member, the receiver being located on a leg of the device and receiving the depending member for vertical adjustment of the second support in relation to the first support, the receiver having a clamp thereon for selectively fixing the vertical adjustment of the second support in relation to the first support.

17. The device of claim 16 wherein the extending arms are curved to enclose a space to receive and retain a novelty item.

18. The device of claim 16 wherein the device has a guide for the depending member.

19. The device of claim 16 wherein the receiver is mounted on a leg of the device and wherein the device has a guide for the depending member, the guide being spaced from the receiver and being mounted on the leg of the device on which the receiver is mounted.

* * * * *